United States Patent [19]

Schatzler et al.

[11] 4,175,784
[45] Nov. 27, 1979

[54] DEVICE FOR MOUNTING THE GUIDE SLEEVE OF A DRIVE CABLE FOR A SLIDING TOP OF AN AUTOMOBILE ROOF

[75] Inventors: Walter Schatzler, Aufhausen; Erich Handler, Starnberg, both of Fed. Rep. of Germany

[73] Assignee: Webasto-Werk W. Baier GmbH & Co., Fed. Rep. of Germany

[21] Appl. No.: 924,003

[22] Filed: Jul. 12, 1978

[30] Foreign Application Priority Data

Jul. 13, 1977 [DE] Fed. Rep. of Germany ....... 2731408

[51] Int. Cl.² .............................................. B60J 7/10
[52] U.S. Cl. ................................................. 296/137 E
[58] Field of Search ........... 296/137 E, 137 F, 137 G, 296/137 A

[56] References Cited

U.S. PATENT DOCUMENTS

| 4,018,476 | 4/1977 | Lutz et al. | 296/137 F |
| 4,056,274 | 11/1977 | Jardin et al. | 296/137 G |

FOREIGN PATENT DOCUMENTS 1306244 9/1962 France .................. 296/137 G

*Primary Examiner*—David M. Mitchell
*Attorney, Agent, or Firm*—Craig and Antonelli

[57] ABSTRACT

A sliding panel device for a cutout in a vehicle body panel, such as a sliding top of an automobile roof, of the type having a sliding panel that is movable between open and closed positions, a headliner displaceable between open and closed positions, a drive cable attached to the sliding panel for displacing the sliding panel and a stationary cantilevered guide for slidably guiding the movement of the cable is improved by the provision of a support attached to the headliner for supporting the cantilevered end of the stationary guide, the support being slidably engageable therewith. According to a preferred embodiment of the present invention, the support supports the guide at at least a pushed-back open position thereof. Furthermore, according to one preferred embodiment the support is a tubular bearing member which surrounds the guide with a sliding seat, while in another preferred embodiment the support is constituted by a longitudinal groove in the top side of the headliner, at least one sliding block being connected to the guide and engaging this groove.

24 Claims, 4 Drawing Figures

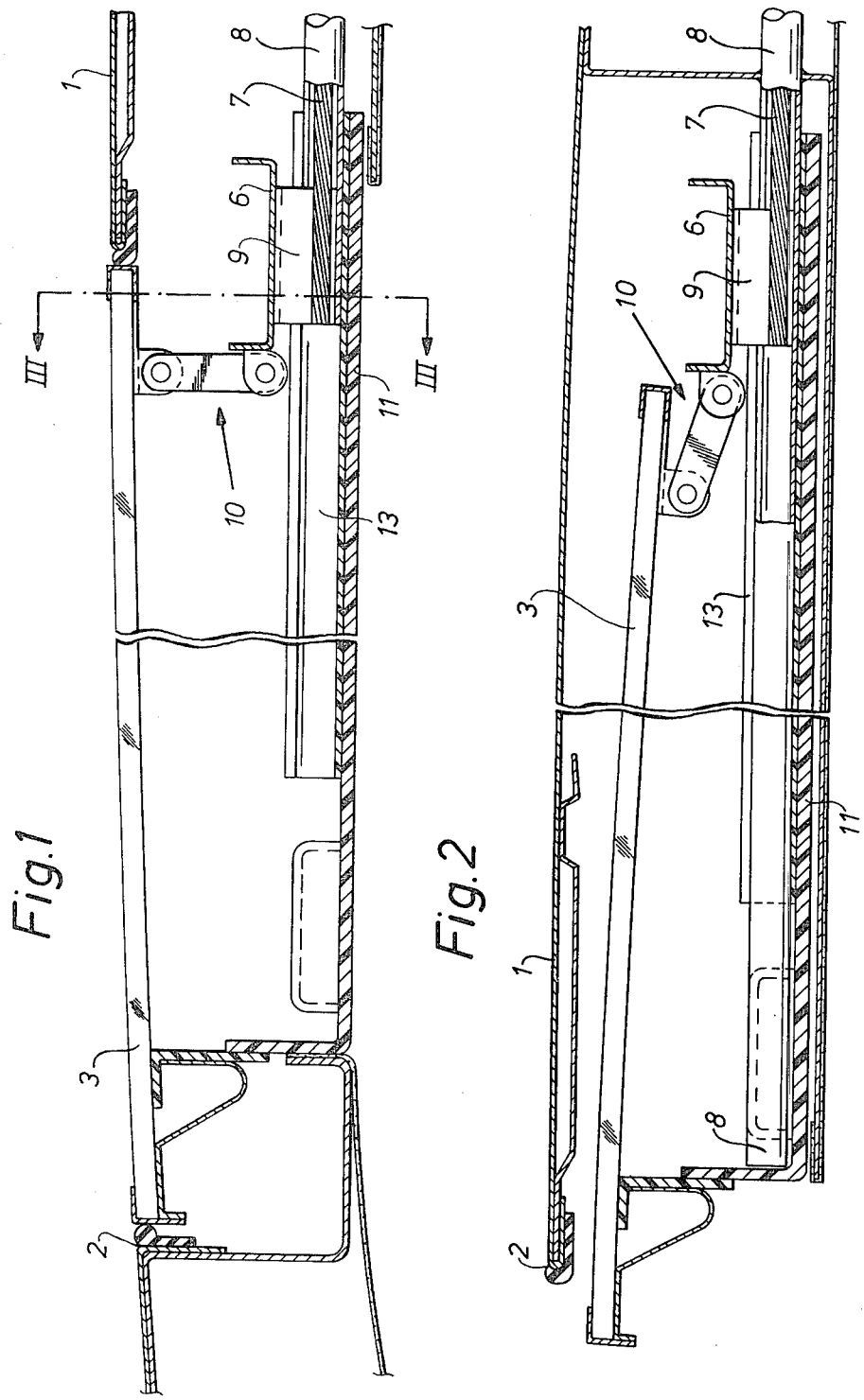

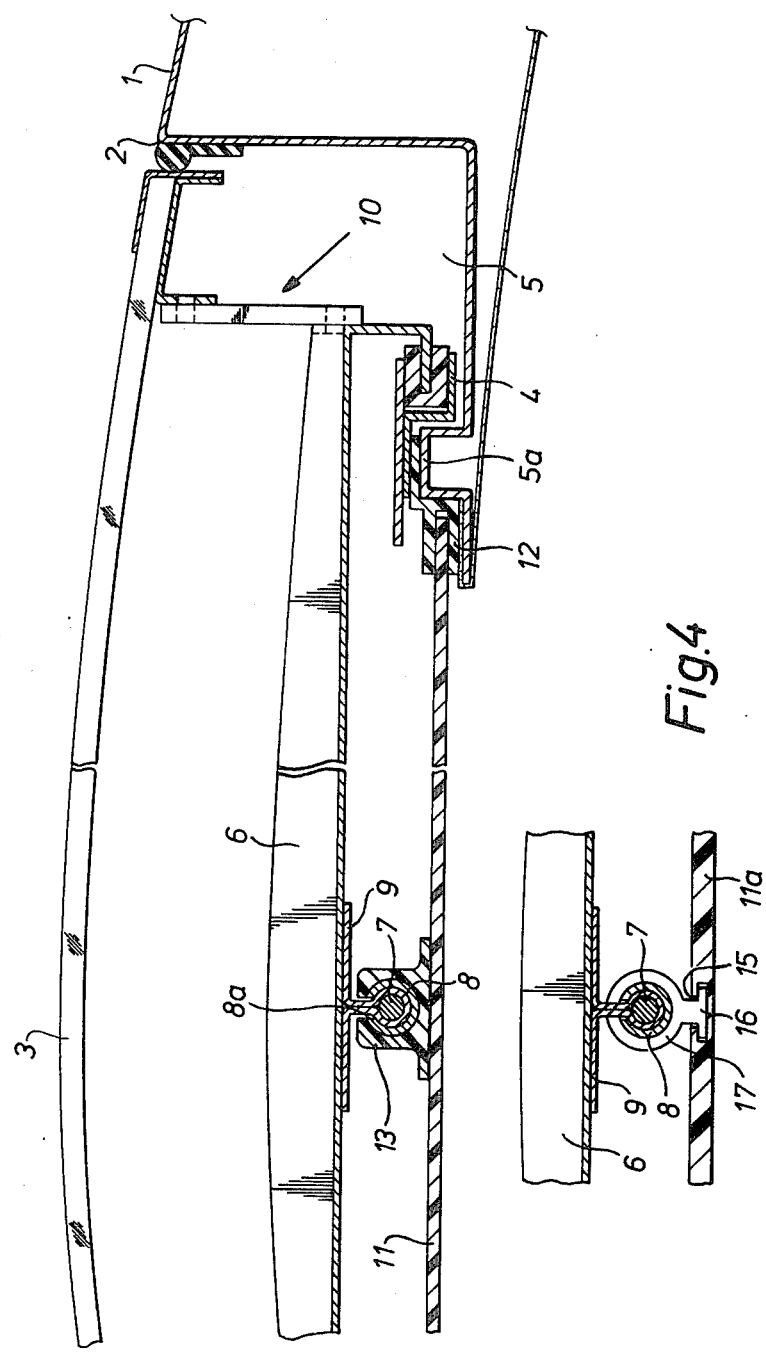

DEVICE FOR MOUNTING THE GUIDE SLEEVE OF A DRIVE CABLE FOR A SLIDING TOP OF AN AUTOMOBILE ROOF

BACKGROUND AND SUMMARY OF THE INVENTION

The invention relates to a device for mounting the guide sleeve of a pressure-resistant drive cable for a sliding top of an automotive vehicle roof, this sliding top being covered toward the inside by a displaceable headliner, wherein the guide sleeve has a longitudinal slot, and the drive cable is attached, by means of a retaining device penetrating the longitudinal slot, to a transport bridge connected to the sliding top.

In conventional sliding roofs of the aforementioned type (DOS [German Unexamined Laid-Open Application] No. 2,461,018) the guide sleeve is supported only at its rear end and extends freely forwardly from its bearing point when the sliding top is pushed back entirely. Thereby, the guide sleeve can commence to oscillate, excited by vehicle vibrations, and give rise to noise by hitting the sliding top as well as the sliding top headliner.

To avoid such oscillations, it is conventional (German Pat. No. 1,228,950) to guide the guide sleeve telescopically in a tube attached to the sliding top. This solution is useless, in particular, for sliding roofs consisting of transparent material with a sliding dome displaceable independently thereof, since this tube, when the sliding top is entirely or partially closed while the sliding dome is pushed back, would be visible from the inside.

Finally, it is known in an automobile roof having a transparent sliding top (DAS [German Published Application] No. 2,502,775) to provide a bearing for the forward end of the guide sleeve on a fixed partition covering the rearward edge of the roof cutout between the sliding top and the sliding headliner. A prerequisite for such a bearing is, therefore, the presence of the aforementioned partition which represents an additional component.

The invention is based on the problem of providing a device for supporting the guide sleeve usable in connection with transparent as well as opaque sliding tops which, except for one bearing element, requires or presupposes no additional parts.

This problem is solved in accordance with this invention by arranging a guide means at the sliding headliner which supports the guide sleeve at least in the pushed-back position of the sliding headliner. The guide means can be attached so that it receives, in the pushed-back condition of the sliding headliner, the forward end of the guide sleeve, but in many cases a support at a spacing from the forward end will be sufficient, if the remaining, cantilevered section of the guide sleeve is so short that it cannot execute any appreciable oscillations. The guide means should extend in the longitudinal direction of the vehicle at least over half the width, but preferably over almost the entire width, of the sliding headliner.

A tubular bearing member can serve as the guide means, this member encompassing the guide sleeve with a sliding fit. In case of a sliding roof wherein the sliding headliner can be independently displaced, the bearing member is provided with a longitudinal slot which coincides in its position with the longitudinal slot of the guide sleeve, so that the retaining means for the drive cable can extend through the longitudinal slot and the sliding headliner can be pushed backwards even when the sliding top is closed. This is advantageous in case of sliding tops of a transparent material.

Alternatively, the guide means can be formed by a longitudinal groove arranged in the topside of the sliding headliner, a sliding block joined to the guide sleeve engaging this groove.

The bearing member consists preferably of a synthetic resin to avoid rattling noises. Alternatively, other known noise-damping measures can be provided, such as plastic coatings or fibrous coverings, on the bearing member or optionally also on the guide sleeve. To reduce friction, the bearing surface can be reduced by grooves so that this surface is formed only by the thus-produced ribs or webs. These webs can receive the guide sleeve elastically, especially in case of short bearing members.

These and further objects, features and advantages of the present invention will become more obvious from the following description when taken in connection with the accompanying drawings, which show, for purposes of illustration only, several embodiments in accordance with the present invention.

BRIEF DESCRIPTION OF THE DRAWINGS

FIG. 1 shows a partial sectional view of a sliding roof for a vehicle in the longitudinal plane of symmetry of the vehicle with a first embodiment of the invention, wherein the sliding top is in its closed position;

FIG. 2 shows a partial view similar to FIG. 1 with the sliding top and sliding headliner pushed back;

FIG. 3 shows a section along line III—III in FIG. 1, and

FIG. 4 shows a section similar to FIG. 3 with a second embodiment of the invention.

DETAILED DESCRIPTION OF THE PREFERRED EMBODIMENTS

In FIGS. 1-3, numeral 1 denotes the fixed vehicle roof having a roof cutout 2 which can be closed off by a sliding top 3; in this embodiment, the sliding top consists of glass or another transparent material. The sliding top 3 is illustrated in FIG. 1 in the closed condition and can be pushed, to uncover the roof aperture 2, rearwardly underneath the fixed roof portion, namely into the position shown in FIG. 2. The sliding top 3 is guided close to its front edge on both sides by means of sliding blocks, not shown, in rails 4 (FIG. 3), attached on the inner wall 5a of a drain groove 5 surrounding the roof aperture 2. In the zone of its rear end, the sliding top 3 is hingedly joined to a transport bridge 6 displaceable in the same rails 4. A pressure-resistant drive cable 7 is attached to the transport bridge 6; this cable is guided in a guide sleeve 8, which is attached to the fixed roof portion and has a longitudinal slot, and can be displaced in one or the other longitudinal direction manually or by means of an electric motor. The cable 7 is attached to the transport bridge 6 by means of a clamp 9 which, as shown in FIG. 3, penetrates the longitudinal slot 8a of the guide sleeve 8 and is threadedly connected to the transport bridge 6. During the displacement of the transport bridge 6 by the drive cable 7, the sliding top 3 is entrained by a lever mechanism 10, which latter is shown only schematically.

The sliding top 3 is covered toward the inside by a sliding headliner 11 which, at least when the sliding top 3 is closed, can be displaced independently of the latter, in order to be able to adjust the amount of light entering through the sliding top 3 as desired. For this purpose, the sliding headliner 11 is guided along its lateral edges in guide rails 12 extending in parallel to the rails 4 and 5 arranged on the inside of the inner wall 5a of the drain channel 5.

The guide sleeve 8 is connected at its end on the right-hand side as seen in FIG. 2 to the fixed roof portion and is otherwise held normally only by the drive cable 7 firmly connected to transport bridge 6, so that when the sliding top 3 is pushed back (FIG. 2), a considerable length of the guide sleeve 8 is without support and can execute oscillations. To avoid this drawback, the guide sleeve 8 is guided with its forward section, i.e. the one on the left-hand side in FIGS. 1 and 2, in a tubular bearing member 13 arranged on the topside of the sliding headliner 11 and extending across more than half the width of the sliding headliner—as seen in the longitudinal direction of the vehicle. The tubular bearing member 13 has a longitudinal slot, just like the guide sleeve 8, in order to allow the fastening clamp 9 of the drive cable 7 at the transport bridge 6 to penetrate and to make it possible to displace the sliding headliner 11 when the sliding top 3 is closed. As can be seen from FIG. 1, the bearing member 13 receives the end of the guide sleeve 8 on the left-hand side in the drawing when the sliding headliner 11 is closed. With the sliding headliner opened completely (FIG. 2), the left-hand end of the guide sleeve 8 projects from the bearing member 13 (see FIG. 2). However, this projecting section is so short that it cannot execute any oscillations which could lead to noise.

The bearing member 13 is preferably made of a synthetic resin having a low friction coefficient, in order not to impede the shifting of the sliding headliner 11 unduly. To reduce the friction, the inner surface of the bearing member receiving the guide sleeve 8 could be provided with longitudinal grooves.

Of course, many modifications of the embodiment shown in FIGS. 1-3 are possible without departing from the scope of this invention. Thus, instead of a single bearing member 13 extending over a substantial portion of the width of the sliding headliner 11, it would be possible to provide several individual, mutually aligned bearing members. Since a support for the end of the guide sleeve 8 on the left-hand side in FIGS. 1 and 2 is necessary, above all, when the sliding top 3 has been displaced entirely or extensively into its open position according to FIG. 2, it could be sufficient in certain cases for avoiding oscillations of the guide sleeve 8 to provide a short bearing member at the level of the left-hand end of the bearing member 13 in FIG. 2. To facilitate the insertion of the guide sleeve 8 into such a bearing member, it would be advantageous to fashion the opening in the bearing member which receives the guide sleeve to be funnel-shaped on the side of the bearing member facing the guide sleeve when the sliding headliner 11 is closed.

Another modification is shown in FIG. 4; in this embodiment, an undercut longitudinal groove 15 in the topside of the sliding headliner 11a, the latter consisting for example of a synthetic resin panel, serves for guiding the guide sleeve 8. The base 16 of a sliding block 17 engages this longitudinal groove 15; the sliding block is fixedly connected to the guide sleeve 8.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Device for mounting the guide sleeve of a pressure-resistant drive cable for a sliding top of an automobile roof of the type wherein the sliding top is covered toward the inside of the automobile by a displaceable headliner, wherein the guide sleeve has a longitudinal slot, and the drive cable is attached, by means of a retaining device penetrating the longitudinal slot, to a transport bridge connected to the sliding top, characterized in that a guide support means is attached to the sliding headliner, this guide support means supporting the guide sleeve at least in a pushed-back open position of the sliding headliner.

2. Device according to claim 1, characterized in that the guide support means is a tubular bearing member which surrounds the guide sleeve with a sliding seat.

3. Device according to claim 1 or 2, characterized in that the guide support means extends in the longitudinal direction of the vehicle at least over half the length of the sliding headliner.

4. Device according to claim 2 wherein said headliner is independently displaceable for sliding relative to said slidable top and further characterized in that the bearing member has a longitudinal slot which coincides, with respect to its position, with the longitudinal slot of the guide sleeve.

5. Device according to claim 3, wherein said headliner is independently displaceable for sliding relative to said sliding top and further characterized in that the bearing member has a longitudinal slot which coincides, with respect to its position, with the longitudinal slot of the guide sleeve.

6. Device according to claim 1, characterized in that the guide support means comprises a longitudinal groove in the topside of the displaceable headliner, and at least one sliding block connected to the guide sleeve and engaging this groove.

7. In a sliding panel device for a cutout in a vehicle body member of the type having a sliding panel movable between first and second positions opening and closing said cutout, a headliner displaceable between said first and second positions, a drive cable attached to said sliding panel for displacing said sliding panel between said first and second positions, and stationary cantilevered guide means for slidably guiding the movement of said cable, the improvement comprising:
support means attached to said headliner for supporting the cantilevered end of said guide means, said support means being slidingly engageable with said guide means.

8. A sliding panel device according to claim 7, wherein said support means supports said guide means at least in a pushed-back open position of said headliner.

9. A sliding panel device according to claim 7 or 8, wherein said support means supports said guide means when said sliding panel is appreciably displaced from said second position.

10. A sliding panel device according to claim 9, wherein said guide means is a guide sleeve and said support means is a tubular bearing member having a sliding seat receiving at least a portion of said bearing member.

11. A sliding panel device according to claim 10, wherein said support means extends in the direction of movement of said sliding panel at least over half the length of the headliner.

12. A sliding panel member according to claim 11, wherein said sliding panel is formed of transparent material, and said headliner is openable independent of said sliding panel.

13. A sliding panel member according to claim 9, wherein said support means comprises a longitudinally extending groove in a side of said headliner facing said sliding panel, and a sliding block connected to said guide means and slidably engageable in said groove.

14. A sliding panel device according to claim 13, wherein the groove extends in the direction of movement of said sliding panel at least over half the length of the headliner.

15. A sliding panel member according to claim 14, wherein said sliding panel is formed of transparent material, and said headliner is openable independent of said sliding panel.

16. A sliding panel member according to claim 7, wherein said sliding panel is formed of transparent material, and said headliner is openable independent of said sliding panel.

17. A sliding panel member according to claim 10, wherein said support means is constructed so as to prevent rattling noises.

18. A sliding panel member according to claim 17, wherein said construction comprises said support means being formed of a synthetic resin.

19. A sliding panel member according to claim 17, wherein said construction comprises said support means being coated with a sound dampening plastic coating.

20. A sliding panel member according to claim 17, wherein said construction comprises said support means being provided with a fibrous covering.

21. A sliding panel member according to claim 13, wherein said support means is constructed so as to prevent rattling noises.

22. A sliding panel member according to claim 21, wherein said construction comprises said support means being formed of a synthetic resin.

23. A sliding panel member according to claim 21, wherein said construction comprises said support means being coated with a sound dampening plastic coating.

24. A sliding panel member according to claim 21, wherein said construction comprises said support means being provided with a fibrous covering.

* * * * *